United States Patent [19]

Ho

[11] Patent Number: 5,056,831
[45] Date of Patent: Oct. 15, 1991

[54] FITTING CONSTRUCTION FOR CONNECTION OF PIPES AND PIPE ASSEMBLY

[76] Inventor: Kuei-Fang Ho, 1 Fl., No. 16, Lane 23, Nan Shen Rd., Taipei, Taiwan

[21] Appl. No.: 517,820

[22] Filed: May 2, 1990

[51] Int. Cl.$^5$ .................................... F16L 35/00
[52] U.S. Cl. ........................ 285/93; 285/115; 285/331; 285/354; 285/355; 285/371; 285/179; 285/156
[58] Field of Search ............. 285/331, 357, 351, 369, 285/391, 398, 251, 91, 93, 115, 354, 355, 179, 156

[56] References Cited

U.S. PATENT DOCUMENTS

| 279,086 | 6/1883 | Emery | 285/331 |
| 4,507,842 | 4/1985 | Werner | 285/371 X |
| 4,599,784 | 7/1986 | Canu et al. | 285/251 X |

FOREIGN PATENT DOCUMENTS

| 428782 | 11/1948 | Italy | 285/251 |
| 21967 | 11/1893 | United Kingdom | 285/351 |
| 253751 | 6/1926 | United Kingdom | 285/251 |
| 587987 | 5/1947 | United Kingdom | 285/331 |

Primary Examiner—Dave W. Arola
Attorney, Agent, or Firm—Poms, Smith, Lande & Rose

[57] ABSTRACT

A fitting construction used for connection of pipes comprising a first pipe assembly having an inner pipe and an outer pipe separated by a wall flange, a corresponding second pipe having a threaded end, a slip-nut having internal threads on its wall part, and first and second gaskets. Either the inner pipe or the outer pipe of the first pipe assembly is provided threads thereon for threadedly engaging or connecting to the second pipe. The second gasket is shaped and sized to be placed on an end face of the second pipe and compressed between it and the wall flange. The outer pipe has an externally threaded end for threadedly engaging the slip-nut with the first gasket being compressed between a cap part of the slip-nut and an end face of the outer pipe. Both the first and second gaskets prevent fluid flowing within and through the inner pipe of the first pipe assembly and the second pipe from leaking out possibly via their connection lines along the outer wall of the inner pipe or the inner wall of the outer pipe 14.

4 Claims, 3 Drawing Sheets

FITTING CONSTRUCTION FOR CONNECTION OF PIPES AND PIPE ASSEMBLY

BACKGROUND OF THE INVENTION

The present invention relates generally to pipe connection constructions. More particularly, the present invention relates to a fitting construction for the connection of pipes in which the pipes to be connected are shaped in such a manner that the connection points are more securely sealed from leakage. Also, the present invention discloses a pipe assembly in conjunction with a known type having a threaded end, which is especially suitable for "anti-leakage" connection of pipes.

A well-known type of pipe connections is that an internally threaded end of one pipe is screwed to an externally threaded end of another pipe with suitable sealing means, such as glues, jackets, petroleum jellies, etc. being applied to the threadedly engaged section to facilitate fluid flowing from one pipe to another pipe without leakage. Although leakage from the engaged section between the pipes of the above type pipe connection is reduced to a certain degree and has been used quite satisfactory, the present invention makes additional improvements thereto.

It is the purpose of this present invention, therefore, to improve the pipe fitting construction suitable for effectively sealing the fluid flowing therewithin from leakage in the manner set forth in the detailed description of the preferred embodiment.

SUMMARY OF THE INVENTION

Accordingly, it is an object of this invention to provide an improved fitting construction for connection of pipes effective in preventing the fluid flowing within the fitted pipes from leakage possibly through the connection sections between the pipes.

A further object of this invention is to provide a pipe assembly adapted to be threadedly engageable with a pipe having a threaded end which is suitable for connection of pipes and effective in preventing fluid flowing within the fitted pipes from leakage.

Another object of this invention is to provide an improved fitting construction for connection of pipes comprising: a first pipe assembly having an inner pipe and an outer pipe connected by a wall flange, at least one second pipe threadedly engageable between the inner pipe and the outer pipe, the outer pipe having an external threaded end, in cooperation with a slip-nut and a gasket, and an internal threaded portion, in cooperation with a second pipe and a gasket. The two gaskets are disposed in such positions that they effectively block fluids flowing within the first pipe assembly and the second pipe from leakage at the connection sections therebetween.

Further objectives and advantages of the present invention will become apparent as the following description proceeds, and the features of novelty which characterize the invention will be pointed out with particularity in the claims annexed to and forming a part of this invention.

DETAILED DESCRIPTION OF THE PREFERRED EMBODIMENT

Figure 1:
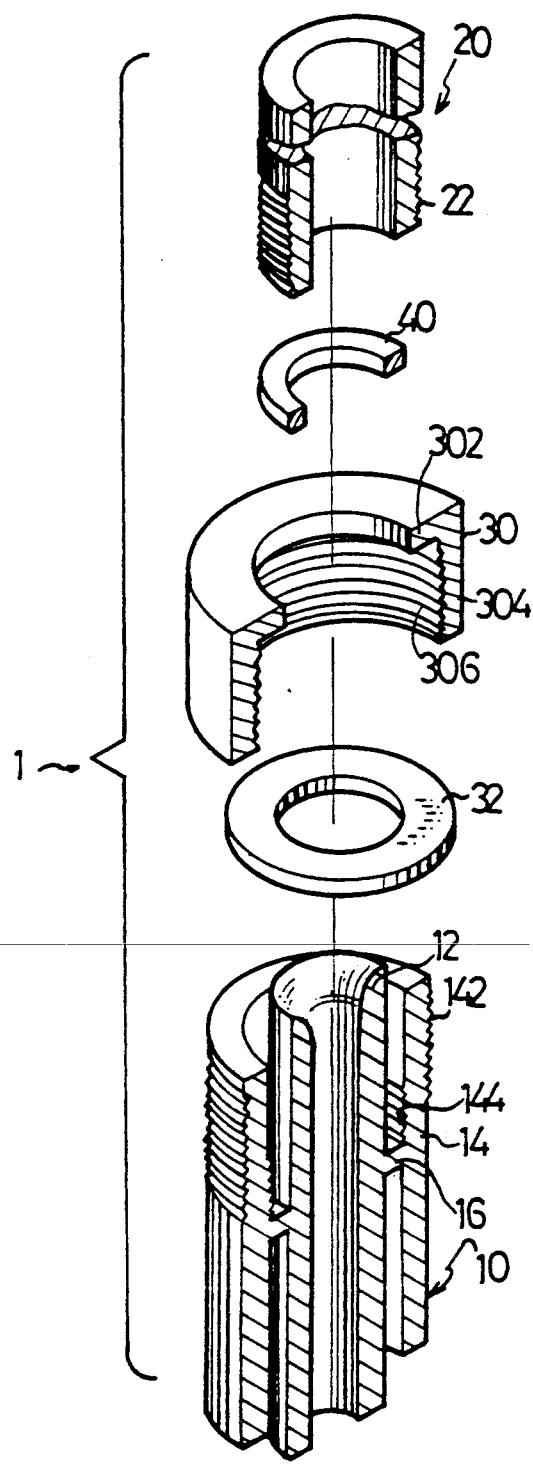
FIG. 1 is an exploded view showing a fitting construction for connection of pipes in accordance with the present invention, certain portions being broken away for increased clarity.
Figure 2:
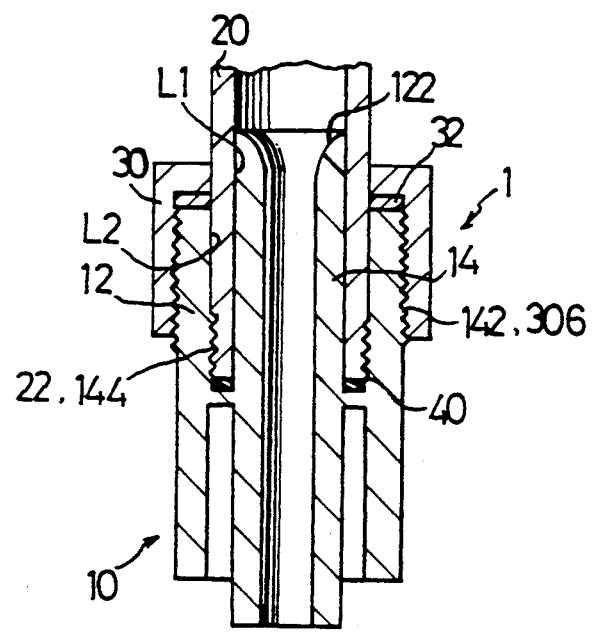
FIG. 2 is an assembled cross-sectional view along a longitudinal axis of the fitting construction for connection of pipes in accordance with the present invention.

Referring now to the drawings, and more particularly to FIGS. 1 and 2, there is shown the fitting construction for connection of pipes, generally designated by reference number 1, which incorporates the preferred embodiment of the present invention.

As shown in FIG. 1, the fitting construction 1 of this invention comprises a first pipe assembly 10 consisting of an inner pipe 12 and an outer pipe 14 connected by a wall flange 16 formed at a suitable location, a second pipe 20 having a threaded end 22, first sealing means comprising a slip-nut 30 and a gasket 32 and second sealing means comprising a gasket 40. It is understood that all the elements 10, 20 and 30 can be made from any suitable material, such as plastics, metals, etc. and the gaskets can be made from plastics too. Also, it is noted that the second pipe 20 can be of conventional design and its threaded end, although shown externally in FIGS. 1 and 2, can be internally provided in respect to the design of the first pipe assembly 10, as will be further described later.

In the embodiment of FIGS. 1 and 2, the outer pipe 14 of the first pipe assembly 10 has an external threaded end 142 on its distal end and an internal threaded portion 144 proximate to the flange wall 16, both extending a suitable length. The external threaded end 142 is engageable with an internal threaded portion 306 of the wall part 304 of the slip-nut 30. The outer pipe 14 can therefore receive the cap-nut 30 by threaded engagement therebetween. The slip-nut 30 further comprises a cap part 302 extending inwards so that the gasket 32 shaped and sized to be placed upon an end face of the outer pipe 14 will be compressed between the cap part 302 of the slip-nut 30 and the end face of the outer pipe 14 to effect a seal, as shown in FIG. 2.

As can be understood, the second pipe 20 is threadedly engageable with the first pipe assembly 10 via their threads 22 and 144. The second sealing means, particularly the gasket 40 in this embodiment, is shaped and sized to be placed and therefore compressed between an end face of the outer pipe 20 and the wall flange 16 when the outer pipe is engaged to the first pipe assembly 10 to effect a seal, as can be seen in FIG. 2. In this manner, the first and second sealing means, particularly the gaskets 32 and 40, will prevent fluid flowing within and through the inner pipe 12 of the first pipe assembly 10 and the second pipe 20 from leaking out possibly via the connection lines, identified by L1 and L2 along the outer wall of the inner pipe 12 and the inner wall of the outer pipe 14, respectively.

To obtain a better result, the inner pipe 12 and the outer pipe 14 of the first pipe assembly 10 are coaxial and offset such a radial distance that when the second pipe 20 is introduced to the first pipe assembly 10, recesses formed between the outer wall of the inner pipe 12 and the second pipe 20 as well as between the inner wall of the outer pipe 14 and the second pipe 20 are as small as possible.

It is a feature of this invention that the inner pipe 12 extends, in a direction relative to and away from the wall flange 16, a length which is larger than the length of the outer pipe 14 so that the inner pipe 12 can resist or protect the second pipe 20 from bending inward when the second pipe 20 is engaged to the first pipe assembly 10 and is forced inward by threading the slip-nut 30 to the outer pipe 14 of the first pipe assembly 10.

In the construction shown in FIG. 2, fluid will flow either from the inner pipe 12 of the first pipe assembly toward the second pipe 20, or vice versa. To facilitate the smooth flow of fluid in either case, the inner pipe 12 has an end 122 which is chamfered and curves from an inside wall toward the outside to permit a smooth flow of fluid therethrough.

While only one side of the first pipe assembly 10 has been particularly shown to comprise the inner and outer pipes, it is apparent that the other side can be suitably provided with same inner and outer pipes so that another second outer pipe can be incorporated or connected thereto. Also, it is apparent that the first pipe assembly 10 can be linear-shaped, elbow-shaped or Tee-shaped.

Figure 3:
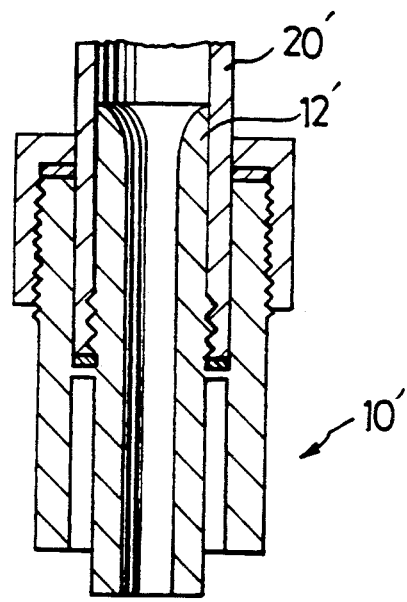
FIG. 3 is a view similar to FIG. 2 but showing an alternative for engaging the second pipe to the first pipe assembly of this invention.

FIG. 3 shows a substantially similar first pipe assembly 10' as the first pipe assembly 10 of FIG. 2. It can be clearly seen from the figure that the inner pipe 12' of the first pipe assembly 10' is externally threaded to engage the internally threaded second pipe 20'.

Figure 4:
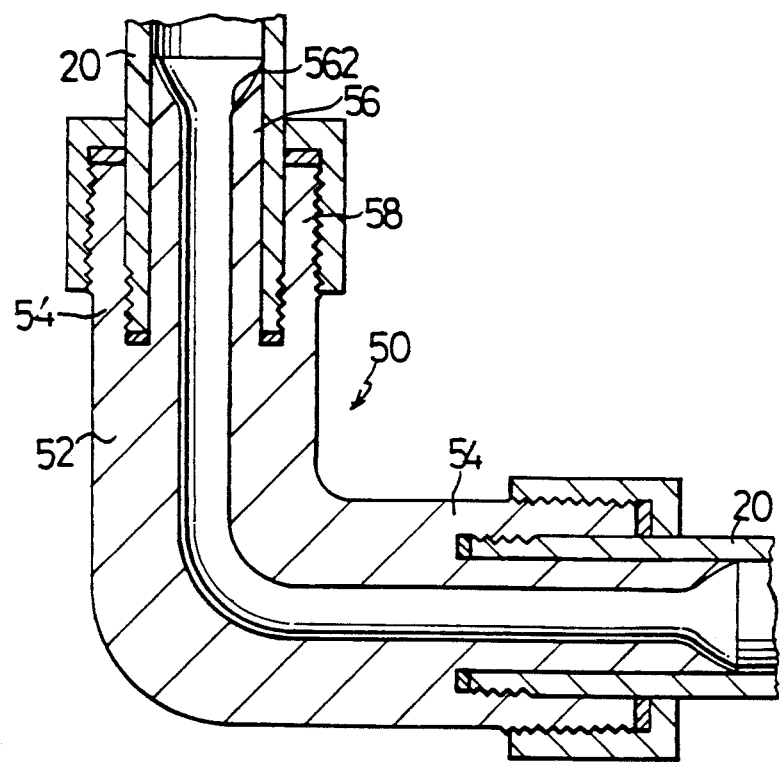
FIG. 4 shows a pipe assembly of this invention in conjunction with two pipes each having at least a threaded end, the pipe assembly being substantially elbow-shaped.
Figure 5:
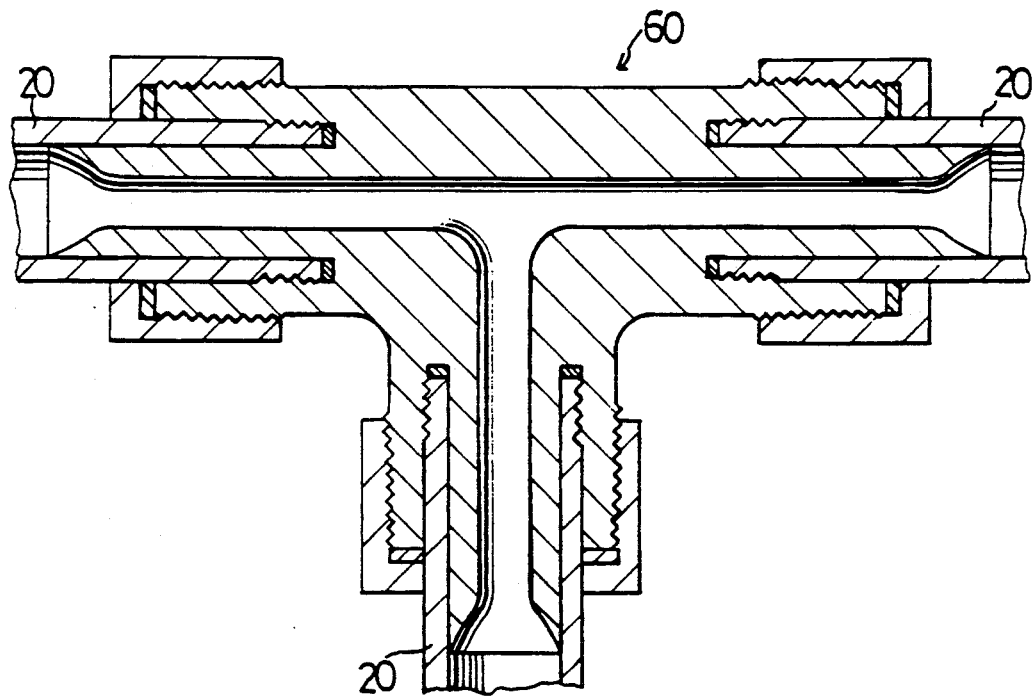
FIG. 5 shows another pipe assembly of this invention in conjunction with three pipes each having at least a threaded end, the pipe assembly being substantially Tee-shaped.

Referring now to FIGS. 4 and 5, there are shown pipe assemblies 50 and 60 which do not contain wall flanges and which are respectively elbow-shaped and Tee-shaped so that they are particularly suitable for long and versatile pipe connections. Since FIG. 4 differs from FIG. 5 only in its shape; i.e., FIG. 4 is elbow-shaped and FIG. 5 is Tee-shaped, description will be made to FIG. 4 only.

The pipe assembly 50 comprises a body portion 52 and a plurality of end portions 54, in this embodiment there are two end portions. The body portion 52 has a passage of suitable diameter along a substantially central axis, thereby permitting fluids passing therethrough. The end portions 54 are integrally formed on the body portion 52 and comprise an inner pipe 56 and an outer pipe 58 both continually extending from the body portion 52 with the inner pipe 56 being longer than the outer pipe 58. Similar to the embodiments shown in FIGS. 1 through 3, the inner pipe 56 and the outer pipe 58 are coaxial and offset a distance corresponding to a wall width of the pipe 20 having an threaded end and intended to threadedly connect with the pipe assembly 50.

Also similar to the above, the pipe assembly 50 of the embodiment of FIG. 4 comprises the inner pipe 56 of the end portion 54 that has an end 562 which is chamfered and curving from an inside wall toward the outside to permit a smooth flow of fluid therethrough. The end 562 has a contour which is more stream-lined.

I claim:

1. Fitting construction for connection of pipes, comprising:
    a first pipe assembly comprising an inner pipe, an outer pipe and means forming a juncture therebetween concentrically fixing said outer pipe to said inner pipe, and a first sealing means provided at said junction of said inner pipe and said outer pipe, said inner pipe extending axially a length larger than that of said outer pipe;
    a second pipe having a threaded end, said first pipe assembly having a threaded portion near said junction of said inner pipe and said outer pipe configured so as to threadedly engage with said threaded end of said second pipe with an end portion of said second pipe being substantially sealingly sandwiched between an outside wall of said inner pipe and an inside wall of said outer pipe, said first sealing means being contacted and slightly pressed by an end surface of said second pipe to indicate and effect a seal between said outside wall of said inner pipe and said inside wall of said outer pipe and said end surface of said second pipe; and
    a second sealing means mounted on an end of said outer pipe of said first pipe assembly for radially urging an outside wall of said end portion of said second pipe inward toward said inner pipe of said first pipe assembly; said second sealing means sealingly engaging said second pipe and an end surface of said outer pipe so as to effect a seal therebetween.

2. Fitting construction for connection of pipes as claimed in claim 1, wherein:
    said outer pipe conprises an external threaded end; and
    said second sealing means comprises a gasket placed on an end surface of said outer pipe of said first pipe assembly and a slip-nut threadedly engageable with said external threaded end of said outer pipe, said gasket being compressed between said slip-nut and said end surface of said outer pipe of said first pipe assembly to radially inwardly urge said end portion of said second pipe toward said inner pipe of said first pipe assembly.

3. Fitting construction for connection of pipes as claimed in claim 2, wherein said slip-nut comprises a cap part for pressing said gasket against said end surface of said outer pipe to deform radially and a wall part having an internal threaded portion for threadedly engaging with said external threaded end of said outer pipe of said first pipe assembly.

4. Fitting construction for connection of pipes as claimed in claim 1, wherein said first sealing means comprises a gasket compressed between said end surface of said second pipe and said junction of said inner and outer pipes.

* * * * *